United States Patent
Kandregula et al.

(10) Patent No.: US 10,382,927 B2
(45) Date of Patent: Aug. 13, 2019

(54) METHOD OF TEXT INPUT FOR WEARABLE DEVICES

(71) Applicant: Samsung Electronics Co., Ltd., Suwon-si, Gyeonggi-do (KR)

(72) Inventors: Naga R. Kandregula, Cupertino, CA (US); Avinash Pillarisestty, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 14/831,749

(22) Filed: Aug. 20, 2015

(65) Prior Publication Data

US 2017/0052665 A1 Feb. 23, 2017

(51) Int. Cl.
  *G06F 1/16* (2006.01)
  *H04W 4/80* (2018.01)
  *H04B 5/00* (2006.01)

(52) U.S. Cl.
  CPC .............. *H04W 4/80* (2018.02); *G06F 1/163* (2013.01); *H04B 5/0031* (2013.01)

(58) Field of Classification Search
  None
  See application file for complete search history.

(56) References Cited

U.S. PATENT DOCUMENTS

| | | | | |
|---|---|---|---|---|
| 6,272,359 | B1 * | 8/2001 | Kivela | H04B 1/38 455/557 |
| 6,947,975 | B2 * | 9/2005 | Wong | H04L 69/329 709/208 |
| 7,996,496 | B2 * | 8/2011 | Haartsen | H04L 67/16 709/218 |
| 8,175,643 | B1 * | 5/2012 | Hawkins | H04M 1/72527 455/41.2 |
| 8,254,991 | B1 * | 8/2012 | Biere | H04M 1/72525 455/418 |
| 8,660,492 | B2 * | 2/2014 | Hong | H04M 1/72561 455/41.2 |
| 9,131,332 | B2 * | 9/2015 | Newham | H04M 1/6066 |
| 9,197,734 | B2 * | 11/2015 | Li | G06F 3/1446 |
| 9,300,720 | B1 * | 3/2016 | Qiu | G06F 9/45504 |
| 9,652,193 | B2 * | 5/2017 | Seo | G06F 3/0488 |

(Continued)

FOREIGN PATENT DOCUMENTS

| | | |
|---|---|---|
| EP | 2713282 A2 | 4/2014 |
| EP | 3010212 A1 | 4/2016 |
| KR | 20150076159 * | 5/2015 |

OTHER PUBLICATIONS

Jared Dipane, Use your computer keyboard to type on your Android device, Oct. 9, 2010, 3 pages.*

(Continued)

*Primary Examiner* — Yongjia Pan

(57) ABSTRACT

A method and apparatus are provided for text input for wearable devices. The method includes receiving a request for a text batch transfer for input text into a text box on an external device. The method also includes displaying a user interface including a text input box based on the received data. The method also includes receiving input text from the text input box on the user interface. The method also includes transmitting a batch of text from the external mobile device through the wireless communication channel.

18 Claims, 9 Drawing Sheets

(56) References Cited

U.S. PATENT DOCUMENTS

| | | | |
|---|---|---|---|
| 2003/0025678 A1* | 2/2003 | Lee | G06F 3/038 |
| | | | 345/173 |
| 2005/0070224 A1* | 3/2005 | Ho | H04M 1/72527 |
| | | | 455/41.2 |
| 2008/0248834 A1* | 10/2008 | Chatterjee | G06F 3/1415 |
| | | | 455/557 |
| 2009/0075697 A1* | 3/2009 | Wilson | A01G 23/04 |
| | | | 455/557 |
| 2011/0084919 A1* | 4/2011 | Lee | G06F 3/023 |
| | | | 345/173 |
| 2013/0024777 A1* | 1/2013 | Brakensiek | G06F 3/048 |
| | | | 715/740 |
| 2013/0138728 A1* | 5/2013 | Kim | G06F 15/16 |
| | | | 709/203 |
| 2014/0073256 A1 | 3/2014 | Newham et al. | |
| 2014/0320398 A1* | 10/2014 | Papstein | H04M 1/7253 |
| | | | 345/156 |
| 2015/0022438 A1* | 1/2015 | Hong | H04M 1/7253 |
| | | | 345/156 |
| 2015/0130688 A1* | 5/2015 | Li | G02B 27/017 |
| | | | 345/8 |
| 2016/0350060 A1* | 12/2016 | Park | G06F 17/24 |

OTHER PUBLICATIONS

Extended European Search Report dated Dec. 16, 2016 in connection with European Application No. 16173871.1, 8 pages.
European Patent Office Communication pursuant to Article 94(3) EPC regarding Application No. 16173871.1, dated May 24, 2019, 4 pages.

\* cited by examiner

METHOD OF TEXT INPUT FOR WEARABLE DEVICES

TECHNICAL FIELD

The present application relates generally to text input, and more specifically, to a method and apparatus for text input for wearable devices.

BACKGROUND

Current text input methods rely on drawing a keyboard or displaying characters on the screen and the user selecting each character one at a time. This method of text input has limitations using the small screens included with wearable devices. Sometimes the text input requires the user to scroll through character several times.

Another text input method requires an active connection with a master device to configure the wearable device. The active connection is not ideal while consuming greater amounts of energy.

SUMMARY

This disclosure provides an apparatus and method for text input for a wearable device.

A first embodiment provides a device for inputting text on a wearable device. The device includes a wireless communication interface configured to communicate with an external device through a wireless communication channel. The device also includes a display configured to display a user interface. The device also includes processing circuitry configured to receive a request for a text batch transfer for input text into a text box on an external device. The processing circuitry also is configured to display a user interface including a text input box based on the received data. The processing circuitry also is configured to receive input text from the text input box on the user interface. The processing circuitry also is configured to transmit a batch of text from the external mobile device through the wireless communication channel.

A second embodiment provides a method for inputting text on a wearable device. The method includes receiving a request for a text batch transfer for input text into a text box on an external device. The method also includes displaying a user interface including a text input box based on the received data. The method also includes receiving input text from the text input box on the user interface. The method also includes transmitting a batch of text from the external mobile device through the wireless communication channel.

A third embodiment provides a system for inputting text on a wearable device. The system includes an external device. The system also includes a device that includes a wireless communication interface configured to communicate with the external device through a wireless communication channel. The device also includes a display configured to display a user interface. The device also includes processing circuitry configured to receive a request for a text batch transfer for input text into a text box on an external device. The processing circuitry also is configured to display a user interface including a text input box based on the received data. The processing circuitry also is configured to receive input text from the text input box on the user interface. The processing circuitry also is configured to transmit a batch of text from the external mobile device through the wireless communication channel.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
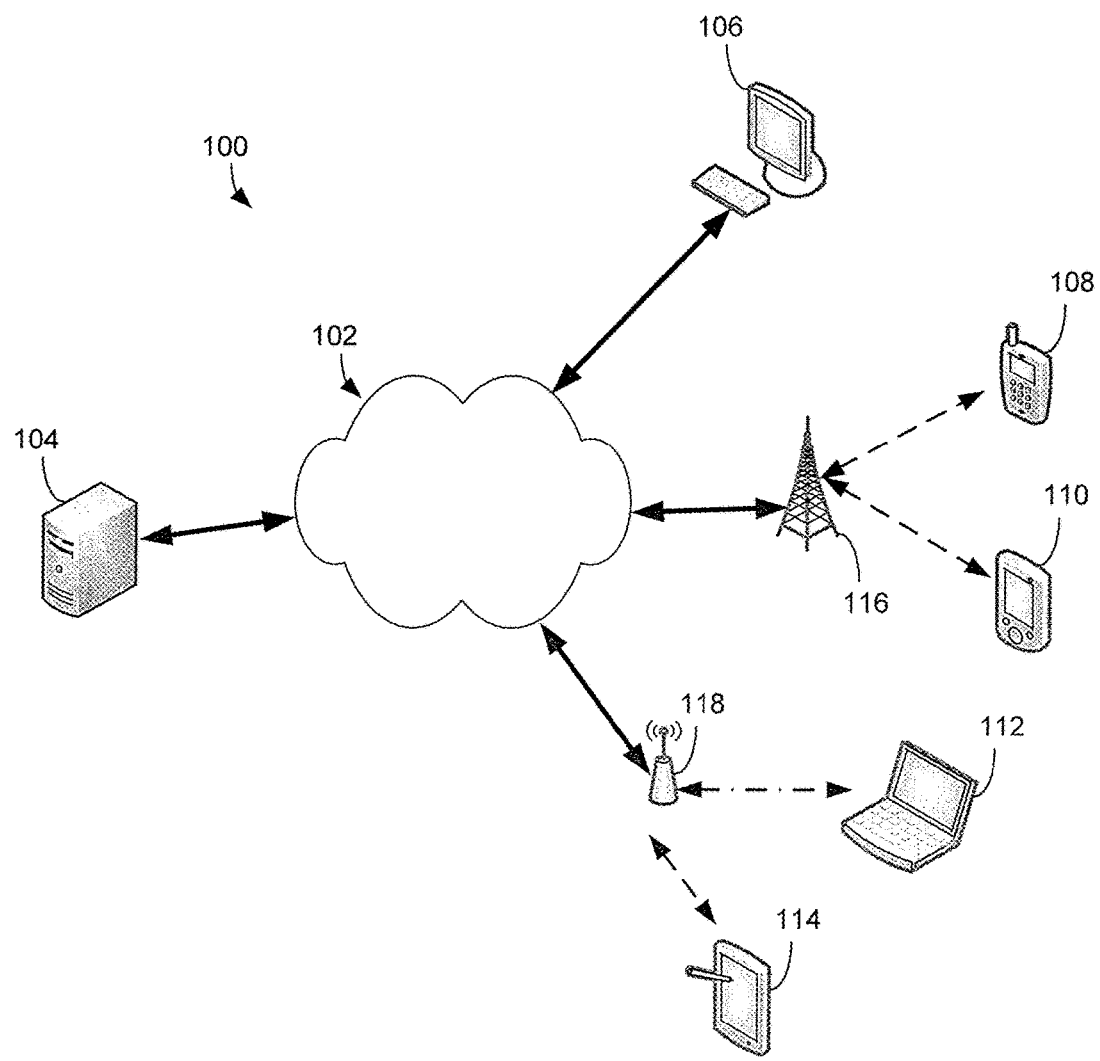
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, embodiments of the disclosure provide a method and apparatus for text input in wearable devices.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
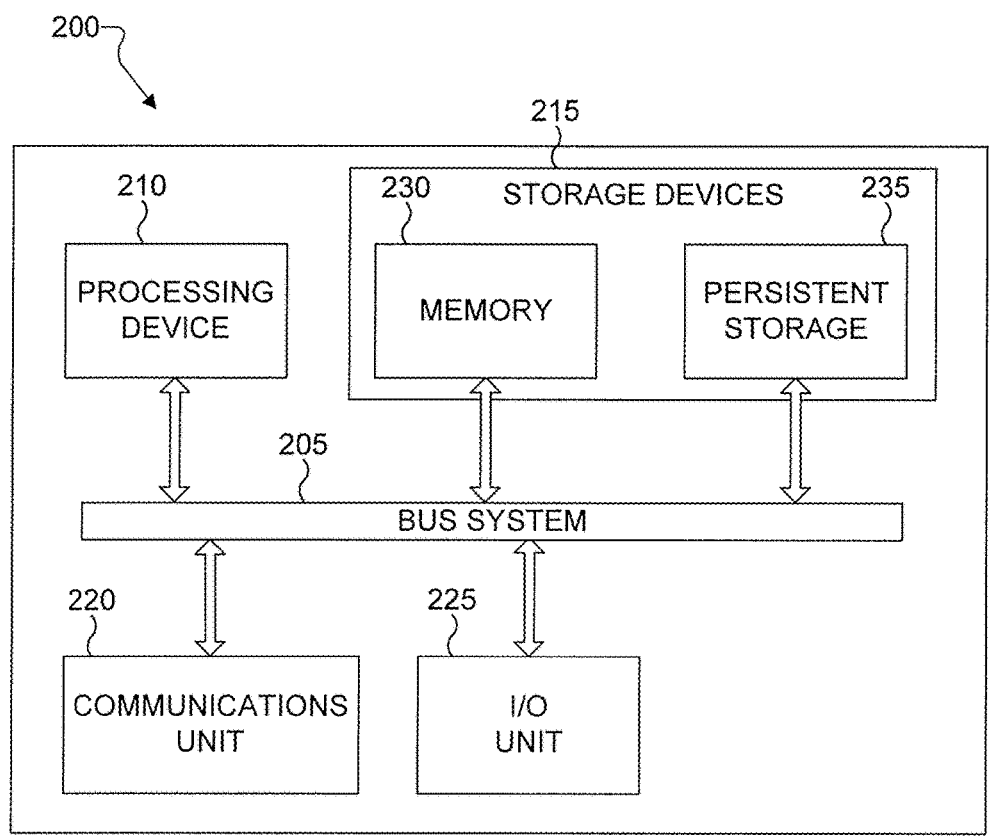
FIGS. 2 and 3 illustrate example devices in a computing system according to this disclosure.
Figure 3:
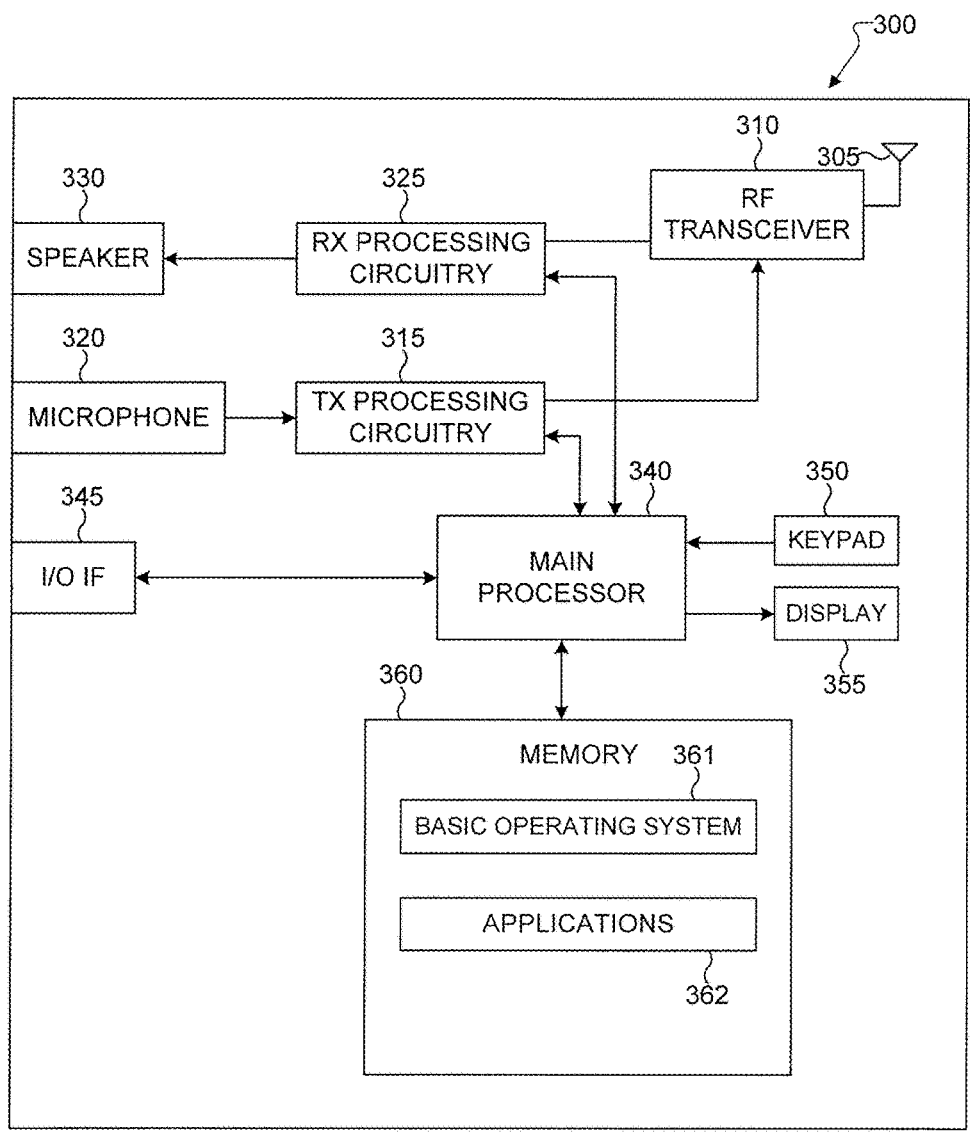

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1, or the wearables devices 405, 505, 605, 705, 805, 810, and 905 in FIGS. 4-9.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for providing a method and apparatus for text input in wearable devices. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, embodiments of the disclosure provide a method and apparatus for text input in wearable devices.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
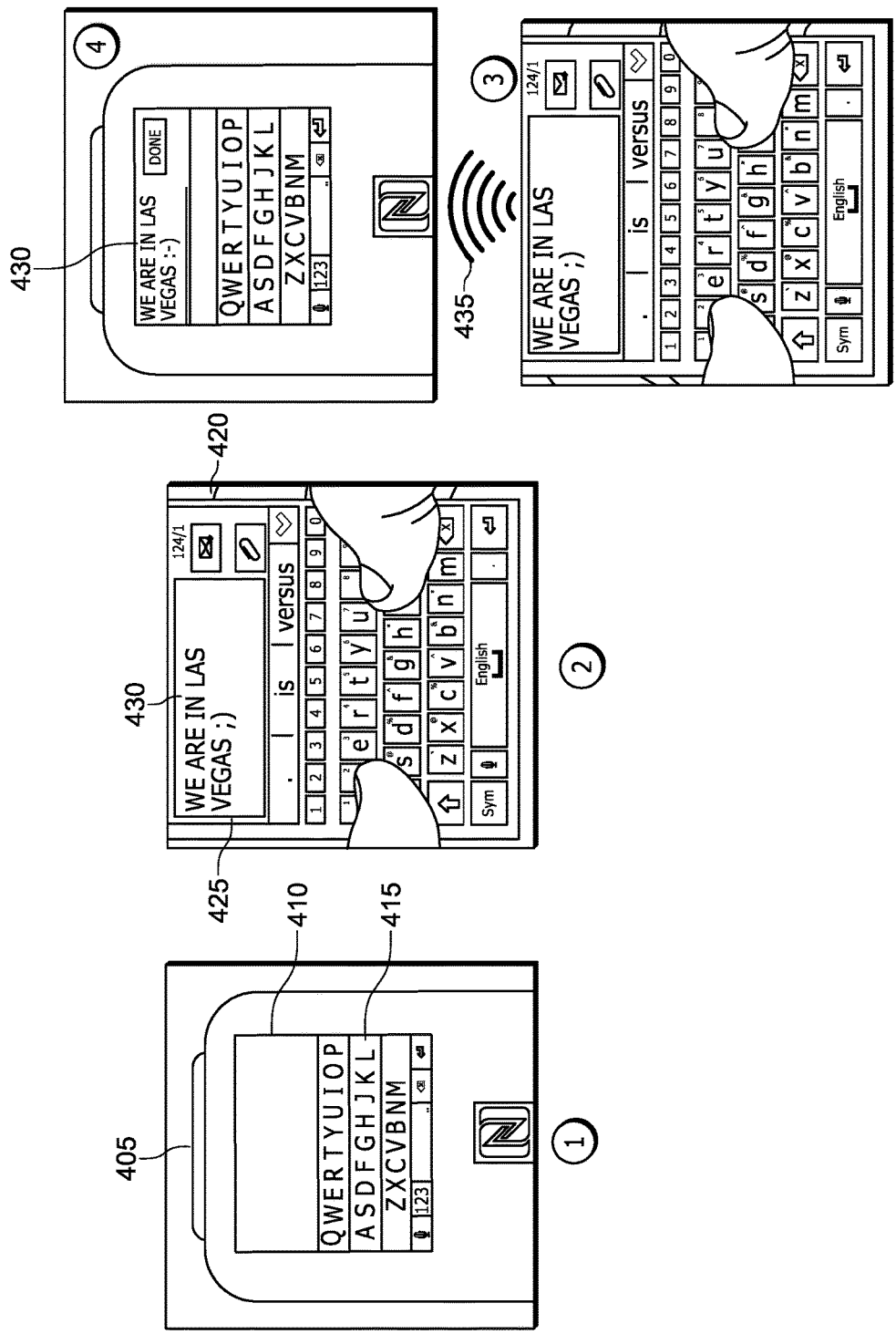
FIG. 4 illustrates a wearable device receiving a text batch from an electronic device in accordance with this disclosure.

FIG. 4 illustrates a wearable device receiving a text batch from an electronic device in accordance with this disclosure.

The wearable device 405 includes an interface 410 that is restricted to the size of the wearable device. The input 415 for the interface 410 is compact and can be difficult to input the text suitable for the user.

A mobile device 420, for example, a cell phone, includes an interface 425 that is larger than the interface 410 found on the wearable device 405. The user inputs text 430 into the interface 425 of the mobile device 420. The wearable device 405 and the mobile device 420 are set to a near field communication (NFC) mode. The wearable device 405 and the mobile device 420 are paired 435 by recognizing the other device through means such as tapping the devices together. Once the devices are paired in NFC mode, the entire text 430 is transferred to the interface 410 of the wearable device 405.

Figure 5:
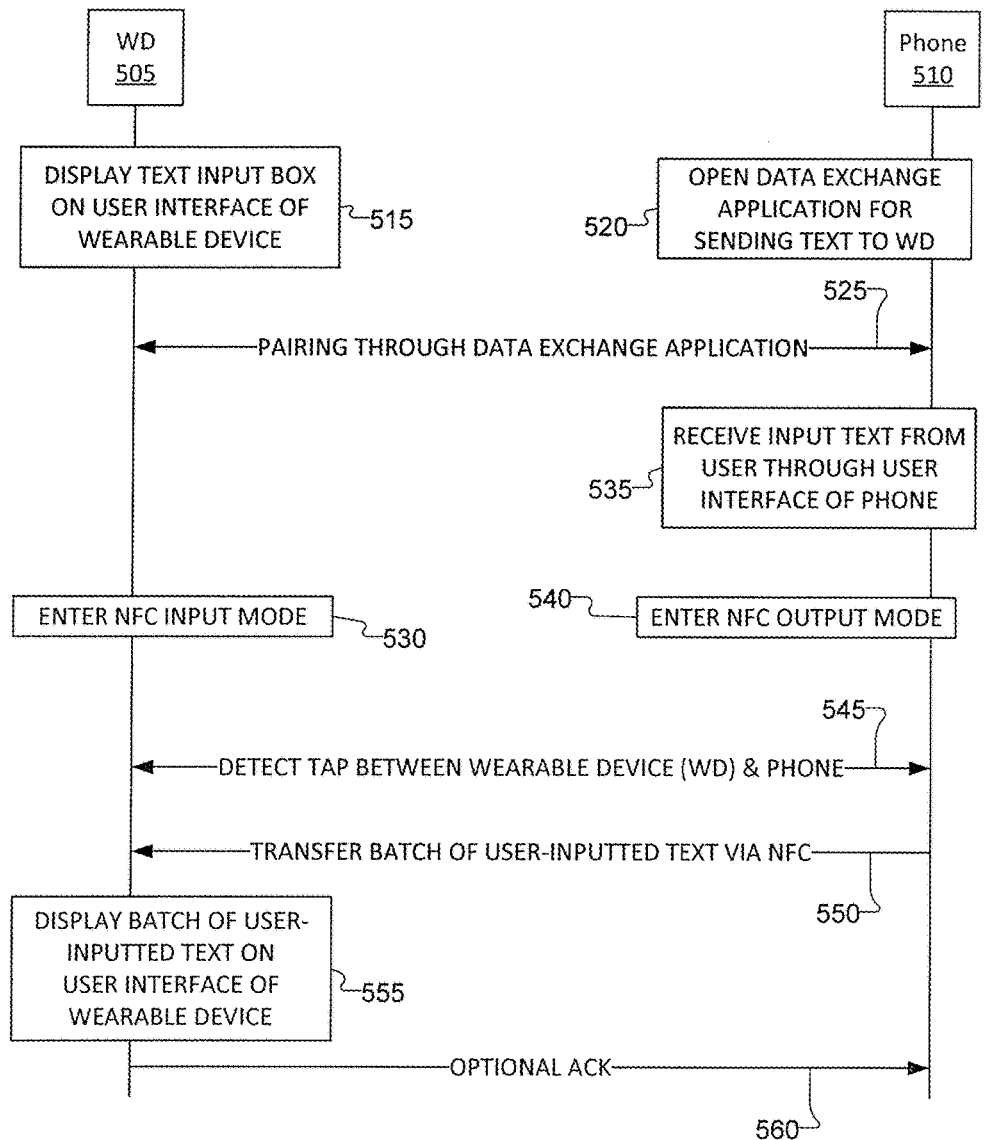
FIG. 5 illustrates a flow diagram for a batch text input on a wearable device from an electronic device in accordance with this disclosure.

FIG. 5 illustrates a flow diagram for a batch text input on a wearable device from an electronic device in accordance with this disclosure.

In operation 515, the wearable device 505 displays text input boxes on the interface. The text boxes can include text descriptions or text indicators for the information to be entered. When a text box appears, the wearable device can include a virtual button on the interface or a physical button on the wearable device 505 that can be used to indicate an external device, such as mobile device 510, is going to transmit text to input into the text box.

In operation 520, the mobile device 510 opens a data exchange application for sending text to the wearable device 505. The data exchange application includes one or more input text boxes for entering text to be transferred to the wearable device. The text boxes in the data exchange application are generic and do not require any information from the wearable device 505. The data exchange application also includes login information for different physical device and also for different applications and webpages, digital certificates, contact profiles, or common phrases. In certain embodiments, the data exchange application recognizes different words and phrases commonly entered by the user and makes suggestions for the next word or phrase.

In operation 525, the data exchange application creates a pairing between the wearable device 505 and the mobile device 510. The pairing indicates to the wearable device 505 and the mobile device 510 that a text batch transfer is to occur. The pairing can be preauthorized or setup in advance, but is not a continuous pairing for this process. That is, the pairing terminates once the data is transferred. The wearable device 505 and the mobile device 510 can be continuously paired through other processes. The pairing can occur over any wireless medium, for example, NFC, Wi-Fi, BLU- ETOOTH, etc. The pairing can require authorization such as displaying a code on one of the devices and entering the code in the other device, or selecting the other device's name or wireless identity.

In operation 530, once the wearable device 505 and the mobile device 510 are paired through the data exchange application, the wearable device enters into an NFC input mode. The NFC input mode is automatically initiated on the wearable device 505 by the data exchange application when text box is in focus or when user explicitly selects required text box by using other available and/or appropriate options. The NFC input mode is temporarily initiated until the completion of the text batch transfer. The wearable device 505 waits for a signal to receive the text batch. The NFC input mode is terminated once the text batch is received. In certain embodiments, other forms of wireless communication can be used, for example, BLUETOOTH or Wi-Fi.

In operation 535, the mobile device 510 receives input text from the user in the input text boxes of the data exchange application. Once the input text is entered, the user completes a transfer request of the input text to the wearable device 505. In certain embodiments, the interface includes a complete button or detects an extend pause, for example, no text input for five seconds. The text can be input through any means, such as through a virtual or physical keyboard or voice-to-text.

In operation 540, the mobile device 510 enters into an NFC output mode. The mobile device enters into the NFC output mode upon completion of the text entry. The NFC input mode is automatically initiated on the wearable device 505 by the data exchange application. The NFC input mode is temporarily initiated until the completion of the text batch transfer. The wearable device 505 waits for a signal to receive the text batch.

In operation 545, the wearable device 505 and the mobile device 510 recognize a signal, such as a tap between the wearable device 505 and the mobile device 510, to transfer the input text. The NFC communication uses magnetic induction when the antennas 305 are within each other's magnetic field. In certain embodiments, the magnetic fields extend up to 20 cm, but bringing the antennas closer together increases the connectivity. The tap indicates that the wearable device 505 and the mobile device 510 are within the maximum range for NFC communication. The tap can be detected through an acceleration sensor or other motion sensor in mobile device 510.

In operation 550, the mobile device 510 transfers a batch of input text to the wearable device 505. The text batch can be a single input or multiple transfers for each text entry on the wearable device 505 for a single transaction. A single text batch can include multiple inputs separately on different lines or using a special character, for example a semicolon. The batch text can also include batch data or form data, for example a Wi-Fi configuration. The batch text comprises a header and a body. The header comprises at least one of a version value and a type id. The body includes at least one of an ssid value, a security value, a password value, a proxy value, and an ipconfiguration value. The text batch can be encrypted by the data exchange application for higher security when transferring. A sample schema for an input value of a user name from the mobile device to a wearable is:

```
<header>
    <version value=1.0/>
</header>
```

```
<body>
    <input value="myusername" enc=0/>
</body>
```

A sample schema for an input value of a password from the mobile device to a wearable is:

```
<header>
    <version value=1.0/>
</header>
<body>
    <input value="@#4ddfr" enc=1/>
</body>
```

A sample schema for a batch of values, for example WiFi setup values, from the mobile device to a wearable is:

```
<header>
    <version value=1.0/>
    <type id="10.1" name="WiFi Configuration"/>
</header>
<body>
    <form>
        <field name="ssid" value="mySSID" enc=0/>
        <field name="security" value="WPA2" enc=0/>
        <field name="password" value="@##44df" enc=1/>
        <field name="proxy" value="192.165.1.2" enc=0/>
        <field name="ipconfiguration" value="DHCP" enc=0/>
    </form>
</body>
```

A sample schema for a WiFi configuration request from the wearable to the mobile device is:

```
<header>
    <version value=1.0/>
    <type id="10.1" name="WiFi Configuration"/>
</header>
<body>
    <form>
        <field name="ssid" enc=0 required=1/>
        <field name="security" enc=0 required =1/>
        <field name="password" enc=1 required=0/>
        <field name="proxy" enc=0 required=0/>
        <field name="ipconfiguration" enc=0 required=0/>
    </form>
</body>
```

A sample schema for a WiFi configuration reply from the mobile device to the wearable is:

```
<header>
    <version value=1.0/>
    <type id="10.1" name="WiFi Configuration"/>
</header>
<body>
    <form>
        <field name="ssid" value="mySSID" enc=0/>
        <field name="security" value="WPA2" enc=0/>
        <field name="password" value="@##44df" enc=1/>
        <field name="proxy" value="192.165.1.2" enc=0/>
        <field name="ipconfiguration" value="DHCP" enc=0/>
    </form>
</body>
```

In operation 555, the wearable device 505 displays the batch of user input text on the interface of the wearable device 505. In certain embodiments, the batch text transferred to the wearable is used for connection to another device, for example a Wi-Fi network. The batch text is used to connect to the device and the wearable device just displays a confirmation. When there are multiple text boxes, the user selects the box for the input text to be transferred in. The selection can be made with a paste function or selection by the user on the wearable device 505. In certain embodiments, the text box is selected before tapping and the input text is automatically entered into the text box upon the transfer.

In operation 560, the wearable device can send an optional acknowledge message back to the mobile device 510. The optional acknowledge message also terminates any connection from this process between the wearable device 505 and the mobile device 510. In certain embodiments, the connections terminate without an acknowledge message upon the completion of the mobile device 510 transmitting the text batch or the wearable device receiving the text batch.

Figure 6:
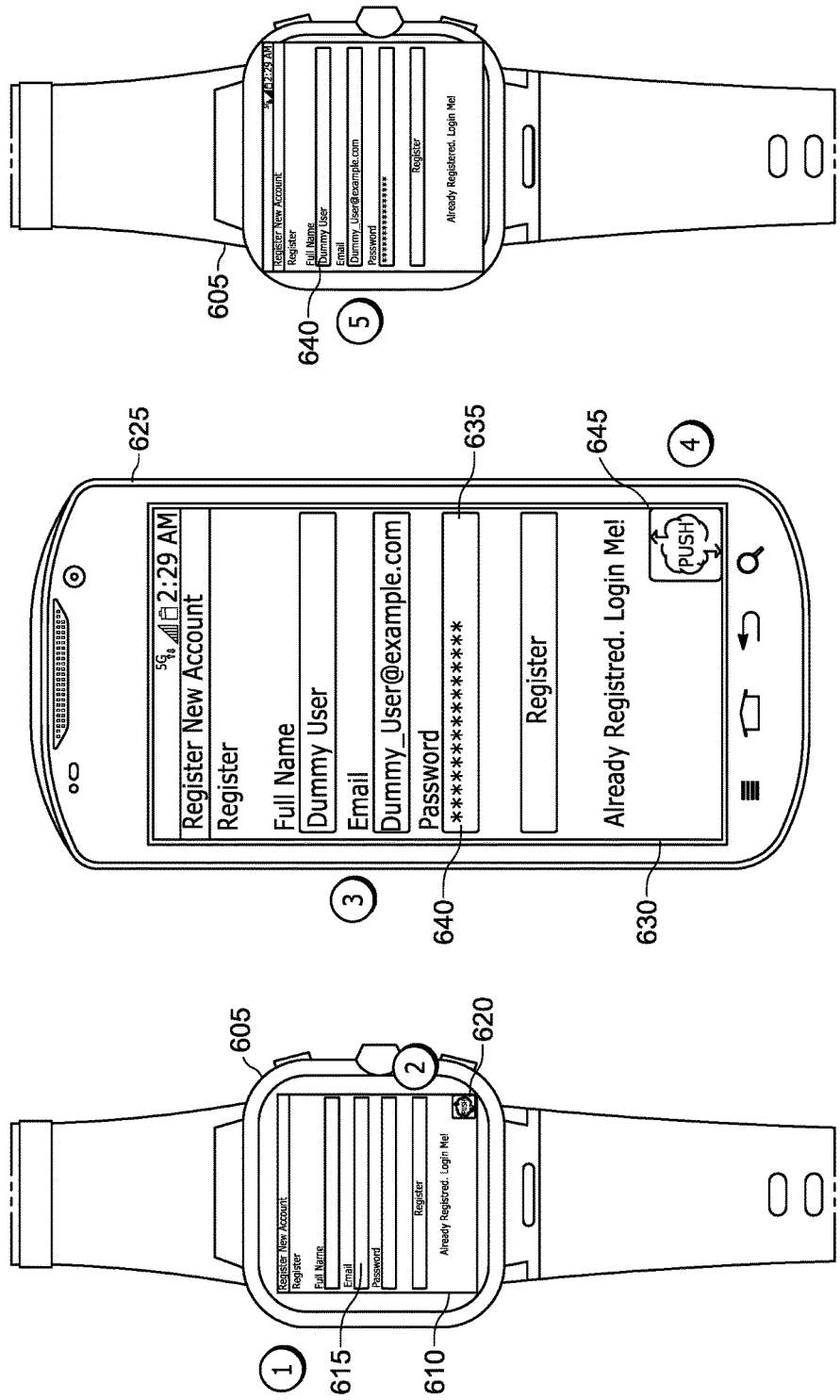
FIG. 6 illustrates a wearable device receiving text input from a mirror interface on an electronic device in accordance with this disclosure.

FIG. 6 illustrates a wearable device receiving text input from a mirror interface on an electronic device in accordance with this disclosure.

The wearable device 605 includes an interface 610 with a number of text input boxes 615 and a push button 620. When the push button 620 is activated, the wearable device 605 transfers a request to transfer the interface 610 with the text input boxes 615 to a mobile device 625. The push button 620 can be a physical button located on the wearable device or a virtual button located on part of the interface.

A mobile device 625, for example, a cell phone, includes an interface 630 and a push button 645. An application on the mobile device 625 detects the request from the wearable device 605 and launches the same app specific user interface (UI) on the mobile device 625. The user inputs text 640 into input text boxes 635 on the interface 630 of the mobile device 625. The push button 645 on the mobile device 625 is activated and the entire text 640 is transferred to the interface 610 of the wearable device 605.

Figure 7:
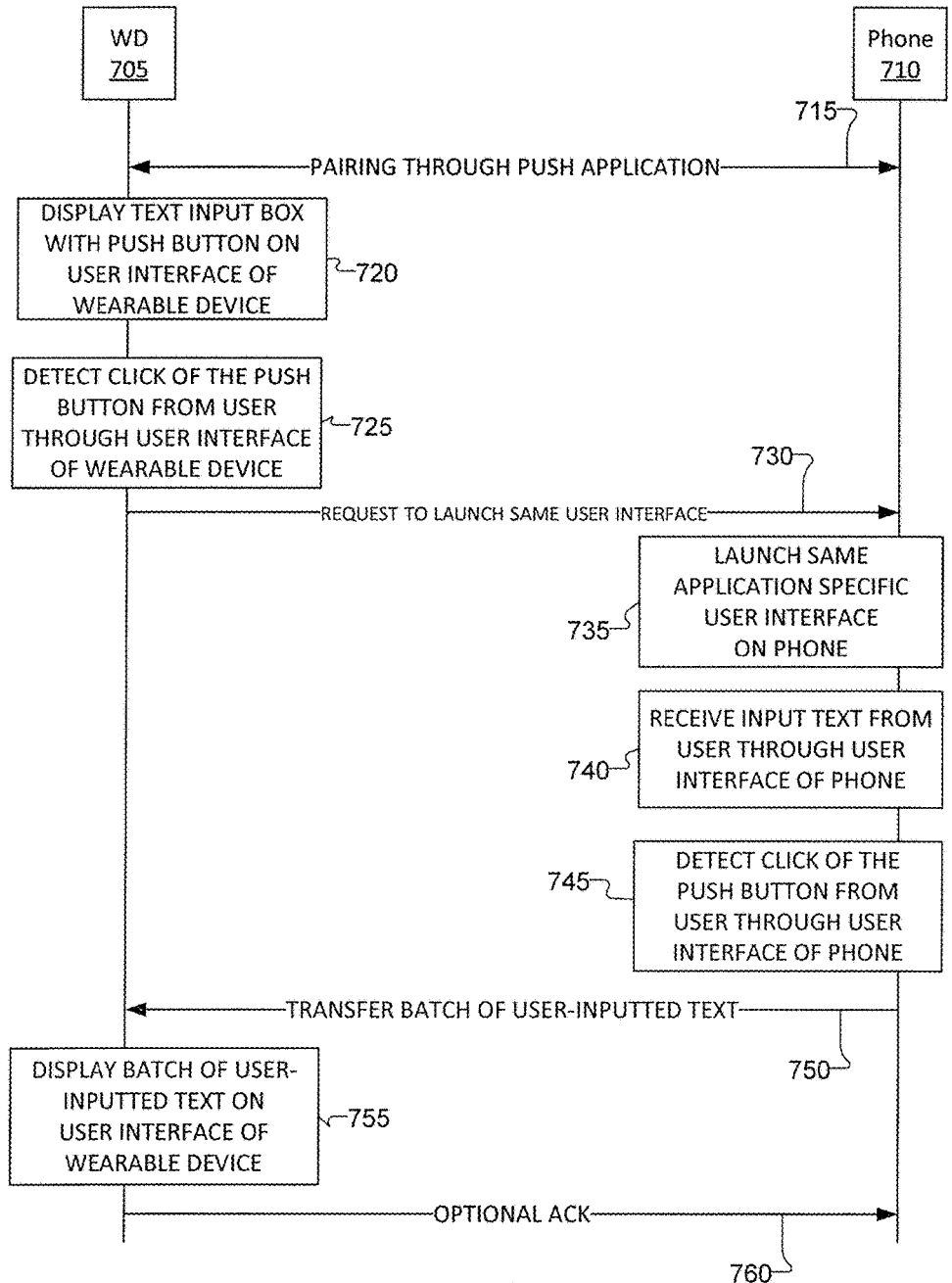
FIG. 7 illustrates a flow diagram for a wearable device receiving text input from a mirror interface on an electronic device in accordance with this disclosure.

FIG. 7 illustrates a flow diagram for a wearable device receiving text input from a mirror interface on an electronic device in accordance with this disclosure.

In operation 715, the wearable device 705 and the mobile device 710 are paired through a push application. Either the wearable device 705 or the mobile device 710 can initiate the pairing process. The pairing indicates to the wearable device 705 and the mobile device 710 that a text batch transfer is to occur. The pairing can be preauthorized or setup in advance, but is not a continuous pairing for this process. That is, the pairing terminates once the data is transferred. The wearable device 705 and the mobile device 710 can be continuously paired through other processes. The pairing can occur over any wireless medium, for example, Wi-Fi or BLUETOOTH. The pairing can require authorization such as displaying a code on one of the devices and entering the code in the other device, or selecting the other device's name or wireless identity.

In operation 720, the wearable device 705 displays a text input box on the interface of the wearable device. The text boxes can include text descriptions or text indicators for the information to be entered. When a text box appears, the wearable device can include a virtual button on the interface or a physical button on the wearable device 705 that can be used to indicate an external device, such as mobile device 710, is going to transmit text to input into the text box.

In operation 725, the wearable device 705 detects a press of the push button from the user. Once a press of the push button is detected, the wearable device 705 transmits a request to launch the same user interface on the mobile device 710.

In operation 730, the data from the interface is transmitted with the request to launch the same user interface. The data transmitted includes all the data from the interface required to be launched in an identical interface of the browser. In certain embodiments, a specific application is created for the transfer of batch text to reduce data transfers.

In operation 735, the mobile device 710 receives the interface data comprising input text boxes, text describing the boxes, etc. and launches an application specific user interface on the phone with identical input text boxes as the interface of the wearable device 705. The text boxes in user interface include specialized data for the type of information that can be entered into the text box. For example, the data exchange application recognizes that a postal code is entered into the text box and requires that a certain amount of numbers are used, such as nine digits for US postal codes. The user interface includes one or more input text boxes for entering text to be transferred to the wearable device. The text boxes in the user interface are the same as on the wearable device 705. The user interface also includes login information for different physical device and also for different applications and webpages, digital certificates, contact profiles, or common phrases. In certain embodiments, the user interface recognizes different words and phrases commonly entered by the user and makes suggestions for the next word or phrase.

In operation 740, the mobile device 710 receives input text from the user in the input text boxes of the data exchange application. Once the input text is entered, the user completes a transfer request of the input text to the wearable device 705. In certain embodiments, the interface includes a complete button or detects an extend pause, for example, no text input for five seconds. The text can be input through any means, such as through a virtual or physical keyboard or voice-to-text.

In operation 745, once the input text is entered, the mobile device 710 detects a press from the push button of the mobile device 710 indicating that the text entry is complete and ready to be transferred to the wearable device 705.

In operation 750, the mobile device 710 transfers a batch of input text to the wearable device 705. The text batch can be a single input or multiple transfers for each text entry on the wearable device 705 for a single transaction. A single text batch can include multiple inputs separately on different lines or using a special character, for example a semicolon. The batch text can also include form data, for example a Wi-Fi configuration. The text batch can be encrypted by the data exchange application for higher security when transferring.

In operation 755, the wearable device 705 displays the batch of user input text on the interface of the wearable device 705. In certain embodiments, the batch text transferred to the wearable is used for connection to another device, for example a Wi-Fi network. The batch text is used to connect to the device and the wearable device just displays a confirmation. When there are multiple text boxes, the user selects the box for the input text to be transferred in. The selection can be made with a paste function or selection by the user on the wearable device 705. In certain embodiments, the text box is selected before tapping and the input text is automatically entered into the text box upon the transfer.

In operation 760, the wearable device can send an optional acknowledge message back to the phone 710. The optional acknowledge message also terminates any connection from this process between the wearable device 705 and the mobile device 710. In certain embodiments, the connections terminate without an acknowledge message upon the completion of the mobile device 710 transmitting the text batch or the wearable device receiving the text batch.

Figure 8:
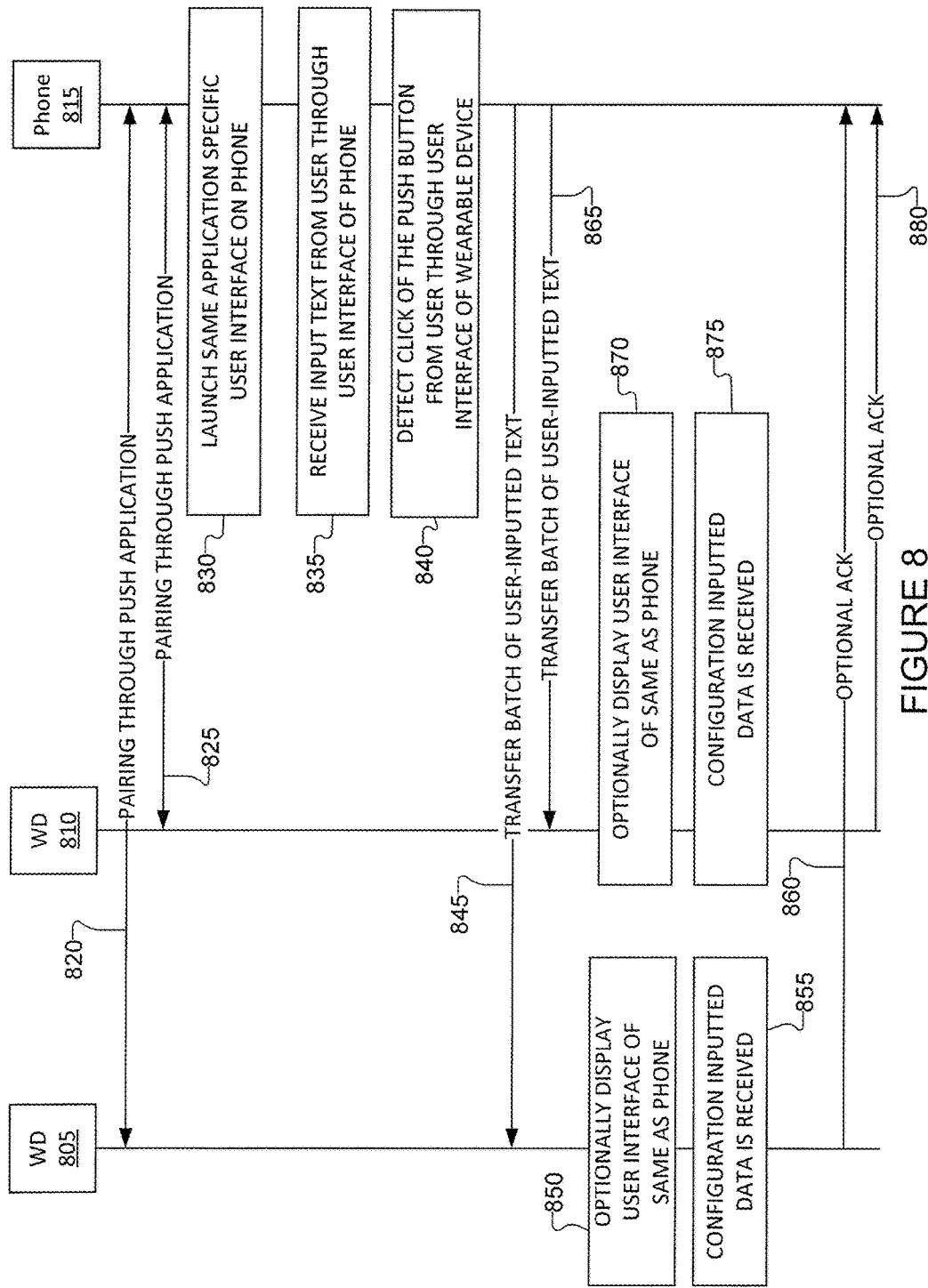
FIG. 8 illustrates a flow diagram for transmitting a batch text input to multiple wearable devices in accordance with this disclosure.

FIG. 8 illustrates a flow diagram for transmitting a batch text input to multiple wearable devices in accordance with this disclosure.

In operation 820, the wearable device 805 and the mobile device 815 are paired through a push application. Either the wearable device 805 or the mobile device 815 can initiate the pairing process. The pairing indicates to the wearable device 805 and the mobile device 815 that a text batch transfer is to occur. The pairing can be preauthorized or setup in advance, but is not a continuous pairing for this process. That is, the pairing terminates once the data is transferred. The wearable device 805 and the mobile device 815 can be continuously paired through other processes. The pairing can occur over any wireless medium, for example, Wi-Fi or BLUETOOTH. The pairing can require authorization such as displaying a code on one of the devices and entering the code in the other device, or selecting the other device's name or wireless identity.

In operation 825, the wearable device 810 and the mobile device 815 are paired through a push application. Either the wearable device 810 or the mobile device 815 can initiate the pairing process. The pairing indicates to the wearable device 810 and the mobile device 815 that a text batch transfer is to occur. The pairing can be preauthorized or setup in advance, but is not a continuous pairing for this process. That is, the pairing terminates once the data is transferred. The wearable device 810 and the mobile device 815 can be continuously paired through other processes. The pairing can occur over any wireless medium, for example, Wi-Fi or BLUETOOTH. The pairing can require authorization such as displaying a code on one of the devices and entering the code in the other device, or selecting the other device's name or wireless identity In operation 830, the mobile device 815 launches an application specific user interface that is same as the interface on the wearable devices 805 and 810. The text boxes in user interface include specialized data for the type of information that can be entered into the text box. For example, the data exchange application recognizes that a postal code is entered into the text box and requires that a certain amount of numbers are used, such as nine digits for US postal codes. The user interface includes one or more input text boxes for entering text to be transferred to the wearable device. The user interface also includes login information for different physical device and also for different applications and webpages, digital certificates, contact profiles, or common phrases. In certain embodiments, the user interface recognizes different words and phrases commonly entered by the user and makes suggestions for the next word or phrase.

In operation 835, the mobile device 815 receives input text from the user in the input text boxes of the data exchange application. Once the input text is entered, the user completes a transfer request of the input text to the wearable devices 805 and 810. In certain embodiments, the interface includes a complete button or detects an extend pause, for example, no text input for five seconds. The text can be input through any means, such as through a virtual or physical keyboard or voice-to-text.

In operation 840, once the input text is entered, the mobile device 815 detects a press from the push button of the mobile device 815 indicating that the text entry is complete and ready to be transferred to the wearable devices 805 and 810.

In operation 845, the mobile device 815 transfers a batch of input text to the wearable device 805. The text batch can be a single input or multiple transfers for each text entry on the wearable device 805 for a single transaction. A single text batch can include multiple inputs separately on different lines or using a special character, for example a semicolon. The batch text can also include form data, for example a Wi-Fi configuration. The text batch can be encrypted by the data exchange application for higher security when transferring.

In operation 850, the wearable device 805 displays the batch of user input text on the interface of the wearable device 805. In operation 855, the wearable device 805 uses the batch text as input data for configuration purposes, such as an initial setup or wireless connection. In certain embodiments, the batch text transferred to the wearable is used for connection to another device, for example a Wi-Fi network. The batch text is used to connect to the device and the wearable device just displays a confirmation. When there are multiple text boxes, the user selects the box for the input text to be transferred in. The selection can be made with a paste function or selection by the user on the wearable device 805. In certain embodiments, the text box is selected before tapping and the input text is automatically entered into the text box upon the transfer.

In operation 860, the wearable device 805 can send an optional acknowledge message back to the mobile device 815. The optional acknowledge message also terminates any connection from this process between the wearable device 805 and the mobile device 815. In certain embodiments, the connections terminate without an acknowledge message upon the completion of the mobile device 815 transmitting the text batch or the wearable device receiving the text batch.

In operation 865, the mobile device 815 transfers a batch of input text to the wearable device 810. The text batch can be a single input or multiple transfers for each text entry on the wearable device 810 for a single transaction. A single text batch can include multiple inputs separately on different lines or using a special character, for example a semicolon. The batch text can also include form data, for example a Wi-Fi configuration. The text batch can be encrypted by the data exchange application for higher security when transferring.

In operation 870, the wearable device 810 displays the batch of user input text on the interface of the wearable device 810. In operation 875, the wearable device 810 uses the batch text as input data for configuration purposes, such as an initial setup or wireless connection. In certain embodiments, the batch text transferred to the wearable is used for connection to another device, for example a Wi-Fi network. The batch text is used to connect to the device and the wearable device just displays a confirmation. When there are multiple text boxes, the user selects the box for the input text to be transferred in. The selection can be made with a paste function or selection by the user on the wearable device 810. In certain embodiments, the text box is selected before tapping and the input text is automatically entered into the text box upon the transfer.

In operation 880, the wearable device 810 can send an optional acknowledge message back to the mobile device 815. The optional acknowledge message also terminates any connection from this process between the wearable device 810 and the mobile device 815. In certain embodiments, the connections terminate without an acknowledge message upon the completion of the mobile device 815 transmitting the text batch or the wearable device receiving the text batch.

In certain embodiments, wearable devices are connected to wireless networks or require initial setup, which a method as described in context with FIG. 8 is useful for not requiring a wired connection. The method described in context with FIG. 8 can also be implemented with devices, such as appliances or other electronics, in place of the wearable devices.

Figure 9:
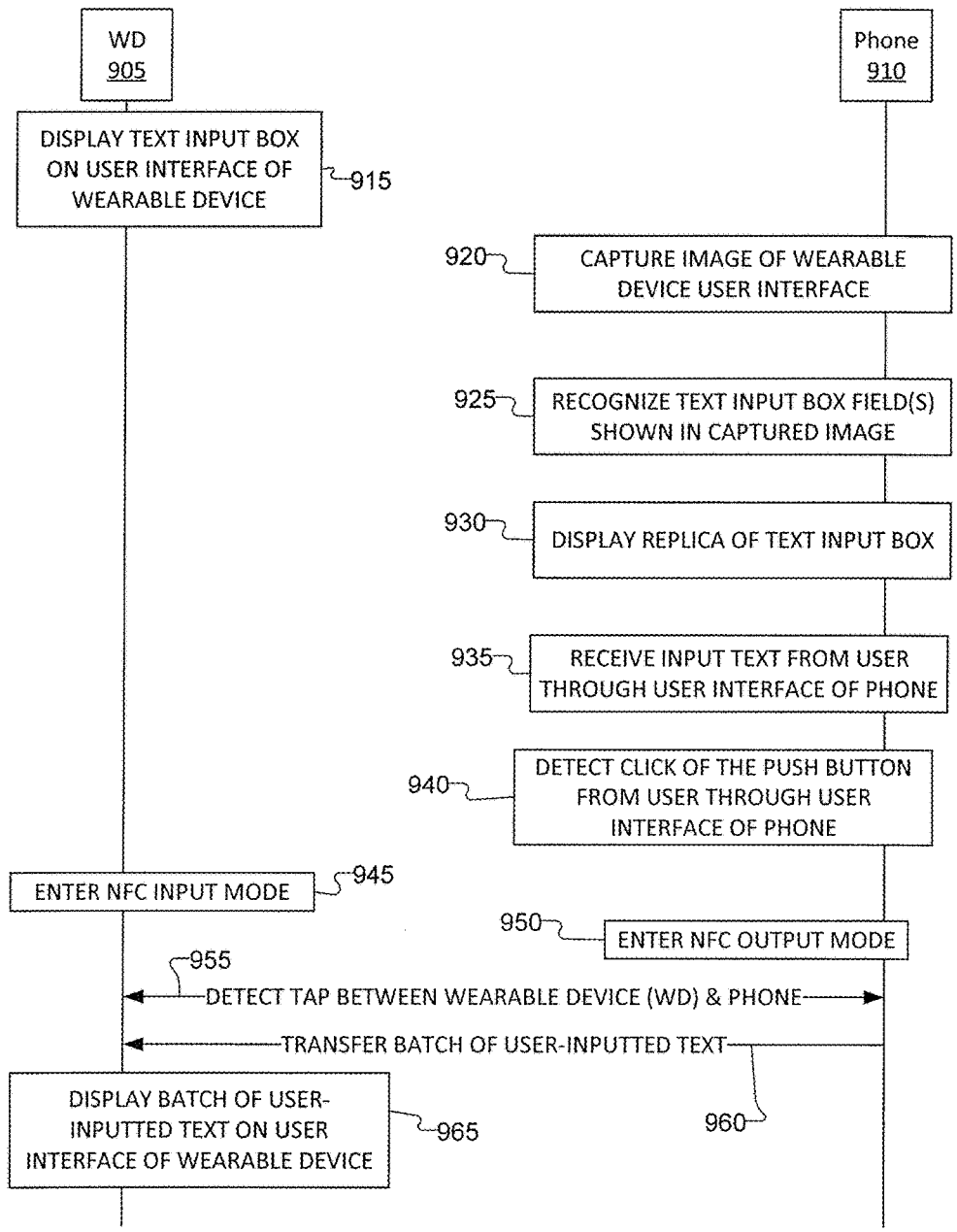
FIG. 9 illustrates a flow diagram for transmitting a batch text input to a wearable device by using an image of the wearable device to determine the text inputs in accordance with this disclosure.

FIG. 9 illustrates a flow diagram for transmitting a batch text input to a wearable device by using an image of the wearable device to determine the text inputs in accordance with this disclosure.

In operation 915, the wearable device 905 displays a number of text input boxes. The text boxes can include text descriptions or text indicators for the information to be entered. When a text box appears, the wearable device can include a virtual button on the interface or a physical button on the wearable device 905 that can be used to indicate an external device, such as mobile device 910, is going to transmit text to input into the text box.

In operation 920, the mobile device 910 captures an image of the user interface of the wearable device 905. The image is captured through an I/O IF 345, such as a camera. The image can also be taken by another device, such as a camera, and loaded on the phone. A pre-stored image can be loaded from a picture gallery or other application 362 stored in the memory 360.

In operation 925, the mobile device 910 recognizes the text input box fields in the captured image. The mobile device uses any method, such as optical character recognition, to create a replica of the user interface of the wearable device.

In operation 930, the mobile device displays the replica of the text input boxes from the interface of the wearable device 905. The text boxes in the user interface are the same as on the wearable device 905 and can include one or more input text boxes for entering text to be transferred to the wearable device. The text boxes in user interface include specialized data for the type of information that can be entered into the text box. For example, the data exchange application recognizes that a postal code is entered into the text box and requires that a certain amount of numbers are used, such as nine digits for US postal codes.

In operation 935, the mobile device receives the input text from a user through the interface on the mobile device 910. Once the input text is entered, the user completes a transfer request of the input text to the wearable device 905. The text can be input through any means, such as through a virtual or physical keyboard or voice-to-text. The user interface also includes login information for different physical device and also for different applications and webpages, digital certificates, contact profiles, or common phrases. In certain embodiments, the user interface recognizes different words and phrases commonly entered by the user and makes suggestions for the next word or phrase. In certain embodiments, the interface includes a complete button or detects an extend pause, for example, no text input for five seconds.

In operation 940, once the input text is entered, the mobile device 910 detects a press from the push button of the mobile device 910 indicating that the text entry is complete and ready to be transferred to the wearable device 905. In certain embodiments, an extend pause or the selection of a predefined text option indicate the text batch is ready for transfer.

In operation 945, the wearable device 905 enters into a NFC input mode. The NFC input mode is automatically initiated on the wearable device 905 by the data exchange application. The NFC input mode is temporarily initiated until the completion of the text batch transfer. The wearable device 905 waits for a signal to receive the text batch. The NFC input mode is terminated once the text batch is received. In certain embodiments, other forms of wireless communication can be used, for example, BLUETOOTH or Wi-Fi.

In operation 950, the mobile device 910 enters into an NFC output mode. The mobile device enters into the NFC output mode upon completion of the text entry. The NFC input mode is automatically initiated on the wearable device 905 by the data exchange application. The NFC input mode is temporarily initiated until the completion of the text batch transfer. The wearable device 905 waits for a signal to receive the text batch.

In operation 955, the wearable device 905 and the mobile device 910 each receive coordinated signals, such as a tap between the two devices, to coordinate the transfer. The tap indicates that the wearable device 905 and the mobile device 910 are within the maximum range for NFC communication. The tap can be detected through an acceleration sensor or other sensor in mobile device 910.

In operation 960, the mobile device 910 transfers a batch of input text to the wearable device 905. The text batch can be a single input or multiple transfers for each text entry on the wearable device 905 for a single transaction. A single text batch can include multiple inputs separately on different lines or using a special character, for example a semicolon. The batch text can also include form data, for example a Wi-Fi configuration. The text batch can be encrypted by the data exchange application for higher security when transferring.

In operation 965, the wearable device 905 displays the batch of user input text on the interface of the wearable device 905. In certain embodiments, the batch text transferred to the wearable is used for connection to another device, for example a Wi-Fi network. The batch text is used to connect to the device and the wearable device just displays a confirmation. When there are multiple text boxes, the user selects the box for the input text to be transferred in. The selection can be made with a paste function or selection by the user on the wearable device 905. In certain embodiments, the text box is selected before tapping and the input text is automatically entered into the text box upon the transfer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
   receiving, by a mobile device, a request for a direct text batch transfer from the mobile device for input text into a text box on a wearable device;
   opening, by the mobile device, a data exchange application for receiving input text from the mobile device for the wearable device;
   pairing, by the mobile device, to the wearable device through the data exchange application over a first wireless medium to indicate to the wearable device that the direct text batch transfer will occur;

receiving, by the mobile device, the input text through a user interface of the mobile device;

receiving, by the mobile device, a confirmation input confirming the input text is ready to batch and transmit; and transmitting, by the mobile device, a batch of text to the wearable device through a second wireless medium that is a direct wireless communication channel temporarily initiated until completion of transmitting the batch of text.

2. The method of claim 1, wherein receiving the request for the direct text batch transfer for input text into the text box on the wearable device further comprises:

pairing, by the mobile device, to the wearable device through a push application; and receiving, by the mobile device, a request to launch the text box from the wearable device on the user interface of the mobile device.

3. The method of claim 1, wherein receiving the request for the direct text batch transfer for input text into the text box on the wearable device comprises:

capturing an image of an interface of the wearable device; and recognizing, by the mobile device, the text box from the wearable device appearing in the captured image.

4. The method of claim 1, wherein the batch of text is transmitted when a press is detected from a push button through the user interface of the mobile device.

5. The method of claim 1, wherein transmitting the batch of text to the wearable device through the second wireless medium that is the direct wireless communication channel comprises:

entering, by the mobile device, a near field communications output mode;

detecting a signal on the mobile device from the wearable device; and transferring, by the mobile device, the batch of text to the wearable device using the near field communications output mode when the signal is detected on the mobile device.

6. The method of claim 1, further comprising communicating with the wearable device through the first wireless medium on a wireless communication channel utilizing a standardized data scheme.

7. A mobile device comprising:
a wireless communication interface configured to communicate with a wearable device through a first wireless communication channel;
a display configured to display a user interface; and
processing circuitry configured to:
receive a request for a direct text batch transfer from the mobile device for input text into a text box on the wearable device;
open a data exchange application for receiving the input text from the mobile device for the wearable device;
pair to the wearable device through the data exchange application over the first wireless communication channel to indicate to the wearable device that the direct text batch transfer will occur;
receive the input text through the user interface of the mobile device;
detect a signal confirming the input text is ready to batch and transmit;
transmit a batch of text to the wearable device through a second wireless communication channel that is a direct wireless communication channel temporarily initiated until completion of transmitting the batch of text.

8. The mobile device of claim 7, wherein to receive the request for the direct text batch transfer for input text into the text box on the wearable device further comprises the processing circuitry to be configured to:

pair to the wearable device through a push application; and receive a request to launch the text box from the wearable device on the user interface of the mobile device.

9. The mobile device of claim 7, wherein to receive the request for the direct text batch transfer for input text into the text box on the wearable device further comprises the processing circuitry to be configured to:

capture an image of an interface of the wearable device; and recognize the text box from the wearable device appearing in the captured image.

10. The mobile device of claim 7, wherein the batch of text is transmitted when a press is detected from a push button through the user interface of the mobile device.

11. The mobile device of claim 7, wherein to transmit a batch of text to the wearable device through the second wireless communication channel further comprises the processing circuitry to be configured to:

enter a near field communications output mode;

detect a signal on the mobile device from the wearable device; and transfer the batch of text to the wearable device using the near field communication output mode when the signal is detected on the mobile device.

12. The mobile device of claim 7, wherein to communicate with the wearable device through the first wireless communication channel further comprises the mobile device to utilize a standardized data scheme.

13. A non-transitory computer-readable medium comprising a plurality of instructions that, when executed by one or more processors of a mobile device, is configured to cause the one or more processors to:

receive a request for a direct text batch transfer from the mobile device for input text into a text box on a wearable device, wherein the plurality of instructions include a header configured to indicate a type of batch values and a body configured to include a plurality of batch values entered on the mobile device and input into separate text fields on the wearable device;

open a data exchange application for receiving input text from the mobile device for the wearable device;

pair to the wearable device through the data exchange application over a first wireless medium to indicate to the wearable device that the direct text batch transfer will occur;

receive the input text through a user interface of the mobile device;

receive a confirmation input confirming the input text is ready to batch and transmit; and transmit a batch of text to the wearable device through a second wireless medium that is a direct wireless communication channel temporarily initiated until completion of transmitting the batch of text.

14. The non-transitory computer-readable medium of claim 13, wherein the type of batch values comprises Wi-Fi setup values.

15. The non-transitory computer-readable medium of claim 13, wherein the header comprises at least one of a version value and a type id.

16. The non-transitory computer-readable medium of claim 13, wherein the body comprises at least one of an ssid value, a security value, a password value, a proxy value, and an ipconfiguration value.

17. The non-transitory computer-readable medium of claim 13, further comprising computer code that, when executed by the one or more processors to receive a request for a direct text batch transfer, pairs the mobile device to the wearable device through a push application and receives a request to launch the text box from the wearable device on the user interface of the mobile device.

18. The non-transitory computer-readable medium of claim 13, further comprising computer code that, when executed by the one or more processors to transmit a batch of text to the wearable device through the second wireless medium that is the direct wireless communication channel, causes the one or more processors to:
- enter the mobile device into a near field communication output mode;
- detect a signal on the mobile device from the wearable device; and
- transfer the batch of text from the mobile device to the wearable device using the near field communications output mode when the signal is detected on the mobile device.

* * * * *